3,158,906
APPARATUS FOR MOLDING PLASTIC ARTICLES
Edwin Leslie Boyer, Plainfield, N.J., assignor to Amerace Corporation, New York, N.Y., a corporation of Delaware
Filed Feb. 19, 1962, Ser. No. 174,029
4 Claims. (Cl. 18—42)

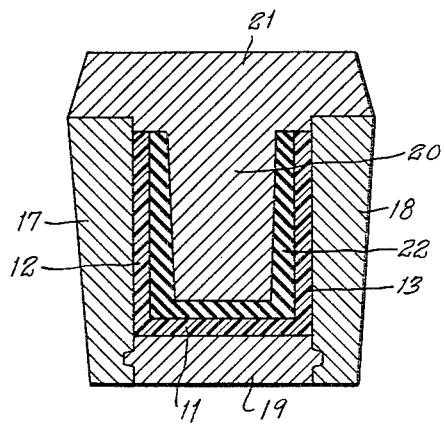
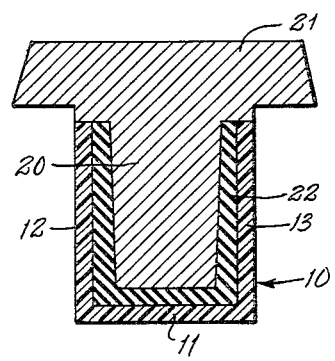
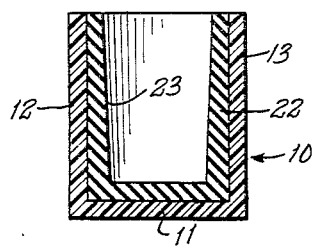
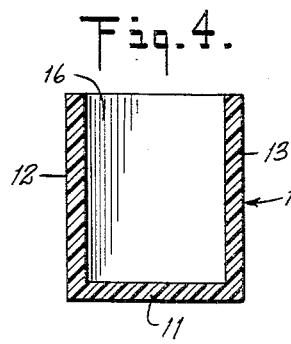
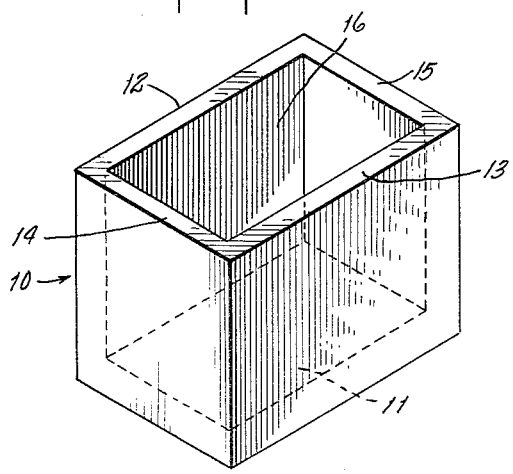
INVENTOR.
EDWIN LESLIE BOYER
BY
ATTORNEY

United States Patent Office 3,158,906
Patented Dec. 1, 1964

The present invention relates to apparatus for molding plastic articles, and more particularly to apparatus for molding such articles wherein the articles are molded in a mold of any suitable type and have a hollow portion or cavity therein. This cavity is formed by a core assembly having an outside configuration including at least one portion which will mechanically prevent the core assembly from being withdrawn from the cavity in the articles being molded without variation in the outside shape or size of the core assembly or damage to or modification of the shape of the articles being molded. Such a cavity might, for example, include one having two or more parallel straight side portions with no relief such that it would be difficult and perhaps impossible to extract the core assembly following the molding of an article. Another instance coming within the purview of the invention is that wherein the cavity has at least one undercut portion formed by a part of the core assembly and wherein this undercut portion of the cavity in the article would prevent the core assembly including a part shaped to form the undercut portion from being withdrawn without variation in the core assembly per se or damage to the article.

A particular type of article wherein the present invention is applicable is in the making of a box-like structure such as might be useful as a battery box, wherein the cavity is substantially rectangular, i.e. in the form of a rectangular prism, and with no relief or taper from the entrance end of the cavity toward the inner end thereof.

The present invention contemplates the provision of apparatus capable of molding articles as aforesaid irrespective of the outside configuration of the articles to be molded, with which the present invention has nothing to do, the requirement of this invention being merely that the outside mold means shall provide a suitable cavity in which the articles may be molded, such mold means being of any conventional or desired type and formed either of one piece or a plurality of pieces which may be separated to permit the article being removed therefrom as desired by the user.

The present invention, therefore, is particularly characterized by the provision of a special type of core assembly in which there are two essential portions or parts including a substantially rigid core portion which is tapered to relatively smaller lateral dimensions toward its outer end, and which constitutes the inner part of the core assembly, and a one-piece liner portion, this liner portion acting as a liner for the article to be molded, but actually forming the outside of the core assembly. This portion has an inwardly tapering inside cavity conforming to the outside configuration of the core portion and adapted to surround such core portion when the core assembly is in its operative position in readiness for the forming of an article and during such an article formation. The space between the liner portion aforesaid when assembled with the core portion as the core assembly on the one hand and the mold means on the other hand constitutes the space in which plastic material may be formed in the molding of a plastic article. In accordance with the present invention the liner portion of the core assembly may be of either of two different types.

First, it may be of a resilient type, formed, for example, of an elastomeric material, so that after the molding of an article, and whether or not the article is first removed from the outer mold or mold means, the core portion of the core assembly is first withdrawn, and then the liner may, due to its flexible character, be flexed sufficiently to remove it bodily from the cavity in the formed article. The elastomeric material must, however, be of the type and character such that it can withstand the conditions of temperature and pressure to which it may be subjected during the actual forming of the plastic article.

The other type of liner portion which is contemplated for use in accordance with the present invention is one of a frangible nature, wherein, following the removal of the central core portion of the core assembly, the liner may be broken into a number of separate fragments, and these fragments separately removed from inside the article which has been molded, all without substantial damage to the article. Under these circumstances the liner will be, of course, of a single use type and must be of material and of a construction such that the cost of producing such liners is not excessive in view of the single use for which they are intended. Glass and some other ceramic materials may be used under these circumstances in the molding of certain types of articles.

Another type of liner which was considered, but which is not presently believed to be fairly within the scope of the present invention is one where the liner itself is formed of a fusable material, so that following the molding of an article, the material of the liner could be fused and poured out of the inside of the cavity in the formed article. The reason for discarding material of this type including such things as waxes or combinations thereof, low melting metals and/or alloys thereof, which melt at quite low temperatures, is that the temperature for molding most plastic articles is sufficiently high so that there is no practical assurance that the liner would not be converted to a molten condition and hence lose its integrity as a shaped element under the temperature and pressure conditions required for molding many, if not all, types of organic plastic materials capable of use in accordance with this invention. For this reason, therefore, fusable materials are to be considered as outside the purview of the present invention, which is restricted to flexible materials on the one hand and frangible materials on the other as aforesaid.

By the use of the present invention, the productivity of a single molding apparatus may be greatly increased in that it is not necessary to tie up the apparatus as to time for the period required for the actual removal of the liner portion of the core assembly in accordance with this invention as aforesaid. This results in more continuous operation of the molding equipment than is possible with prior art constructions.

The further advantage of the apparatus of the present invention lies in that it is possible, when forming articles having somewhat different sized cavities, to use the same core with different liners having appropriate thicknesses or configurations or both, as may be required to produce the desired shape and size cavities for different articles. Inasmuch as the liners are much cheaper to manufacture than the core, this makes the same molding equipment, other than the liner, of more general use.

Other alternative processes and apparatus and advantages of the invention will become apparent as the description proceeds, wherein a single type of article is to be molded and wherein various equivalents will be pointed out.

A preferred form of the invention is illustrated in the accompanying drawings, in which:

FIG. 1 illustrates in vertical cross-section a box-like article being molded in apparatus according to the present invention, the outer mold means, the core assembly and the liner being shown in the molding position thereof and a molded article being shown in the cavity in the mold;

FIG. 2 is a view similar to FIG. 1 with the outer mold means removed;

FIG. 3 is a view similar to FIGS. 1 and 2 with the core portion of the core assembly removed from inside the liner portion and showing the liner portion still inside the molded article;

FIG. 4 is a similar view showing the molded article after the liner portion has been removed therefrom; and FIG. 5 is a view in perspective of the molded article after the liner portion has been removed therefrom.

The present invention is described herein as applied to the molding of an article of a very simple form, namely, a substantially rectangular box structure which might be used as casing for one cell of a storage battery, for example. The article 10 is shown in FIGS. 4 and 5 and consists of a planiform bottom wall 11, parallel side walls 12 and 13 and parallel end walls 14 and 15, the end walls being perpendicular in each instance to the side walls 12 and 13, and all the walls 12–15 inclusive being perpendicular to the bottom wall 11. Thus, it may be said of this article that it comprises a bottom wall lying in a plane which is substantially perpendicular to the direction of the depth of the cavity 16 therein, and the depth thereof being vertical as seen in FIG. 4. The side walls 12–15 inclusive are shown of the same thickness at the top as they are at the bottom, so that the cavity 16 is in the form of a right prism. If such a cavity were to be formed by a one-piece core member there would be no relief or tapering of the cavity from top to bottom which would permit the easy removal of the core following the molding of the article. Such relief or tapering is substantially always used to permit the easy removal of a core member as it is practically impossible to remove the core under other circumstances unless the article per se is of substantially elastic character to permit it to stretch in being removed from the core. This is not contemplated for the article being molded according to the present invention.

As hereinabove set forth, the invention is applicable to apparatus for forming the article in any desired type of outside mold and with any desired outside configuration. For example, the outside shape of the article could be provided with a taper to permit it being removed from a one-piece mold; or alternatively, the mold could be made in a plurality of parts as shown in FIG. 1 wherein two side members 17 and 18 are provided, which are split on a vertical line (not shown) and which combine with a separate bottom member 19 in forming the outside mold for the article. With such a mold construction or mold means, as it is called in this disclosure, the side members 17 and 18 of the mold may be opened and the article then removed from the bottom 19 of the mold. Any desired mold supporting, opening and closing means may be employed, all of which form per se no part of the present invention.

It may be desired to form raised or indented designs on the sides or bottom of the article to be formed; and if so the mold parts 17, 18 or 19, or several of them as necessary, may be appropriately formed to give the desired configuration to the outside of the article. Again, this forms per se no part of the present invention.

The present invention preferably employs a core assembly including an inner core portion generally indicated at 20 which may be suitably attached to a mold head portion 21 or other appropriate means. These parts may be supported and actuated by any conventional means (not shown), which per se form no part of this invention.

The core portion 20 in this instance does not have to be shaped to form the exact configuration of the cavity 16 aforesaid, but is preferably formed with a tapered outside configuration and is surrounded by a liner portion 22 of suitable material and character as aforesaid, wihch has inside cavity 23 having substantially the exact configuration of the core portion 20. The core portion 20 is tapered in at least one lateral dimension, and preferably in both lateral dimensions, from its uppermost toward its lowermost end. Similarly, the cavity 23 in the liner 22 has at least one, and preferably both its lateral dimensions, i.e. dimensions parallel to the bottom 11 of the finished article, which are less than the corresponding dimensions adjacent to the entrance of the cavity, i.e. at the top as seen in FIG. 3. If then a suitable mold release lubricant is applied, so as to be disposed as a film between the core portion 20 and the liner portion 22, the removal of the core portion from inside the liner portion as seen by a comparison of FIGS. 2 and 3 is facilitated. The liner portion 22 itself may thereafter be removed from inside the final article 10. This liner portion is shown in the drawings as a rubber or rubber-like material, i.e. of elastomeric construction. An alternative hereinabove referred to is to construct the part 22 of glass or other frangible material. Inasmuch as this construction differs only in material from that shown in the drawings, no additional illustration is given.

In accordance with a desired cycle of molding operation, the first act in the use of apparatus according to the present invention is to insert the core portion 20 with the liner portion 22 thereon into a suitable mold as shown in FIG. 1 at 17, 18 and 19. The molding material may then be injected into the mold in the event that an injection or transfer molding operation is to be carried out. If, on the other hand, molding material is placed in the mold first and is to be formed to the desired shape by the pressing action of the core assembly moving into the mold, this may be done by first putting the liner portion onto the core portion then using the entire core assembly as a pressing plunger to force the molding material to the shape of the desired mold cavity, i.e. the space between the liner portion and the mold.

In some instances it may also be desired to form a plastic article about the core assembly without using an outer mold corresponding to the mold means 17, 18, 19. Such a construction might, for instance, include forming mats of glass fiber around a core assembly, impregnating such mats with a polyester resin and thereafter curing the resin in an appropriate manner. Even under these circumstances it may well be that it would be difficult and sometimes impossible to remove the formed article from the core assembly were it not for the provisions of the present invention.

In whatever manner the plastic material is molded, and assuming that heat is supplied where and if necessary in accordance with the type of plastic material being used, the removal of the article from the mold may be effected by first removing the molded article and the core assembly as a unit from the mold (if used) in any appropriate way; then stripping the combined molded article and liner portion from the core portion as seen by comparison with FIGS. 2 and 3; and thereafter removing the liner portion from the inside of the molded article. Alternatively, and if desired, the invention contemplates an operational sequence comprising removal of the core portion from inside the liner portion prior to the removal of the liner portion and the molded article from the mold, then removing the molded article and liner portion from the mold, and usually last, removing the liner portion from inside the molded article. The invention further contemplates, however, if desired, removing the liner portion from inside the molded article prior to removing the molded article from the mold. In any event, the same or another liner portion is placed over the core portion prior to the molding of the next article. In the event that a single use frangible liner portion is used, it will always be necessary to employ a new liner portion for each article molded.

It is specifically contemplated that almost any type of plastic material may be molded using apparatus according to the present invention. One example is the use in molding a plastic material of the type known as "ABS" type resins. Such resins may be described as of the polymerized acrylonitryl-butadiene-styrene type. Commercial forms of such resins in the form of moldable material are sold under the trade name "Kralastic MV" which is produced by Naugatuck Chemical Division of the U.S. Rubber Company; and "Cycolac," produced and sold by Marbon Chemical Division of Borg-Warner Company.

Further, in order that this invention may be specific and complete, two types of materials which may be used as the flexible or elastomeric liner portions are given here, the first being a so-called butyl liner which may be made up as follows:

|  | Parts by weight |
| --- | --- |
| "Butyl 325" | 100 |
| MAF Black | 60 |
| Zinc oxide | 25 |
| "Vistanex L-100" | 5 |
| Sulfur | 2 |
| p-Quinone dioxime | 2 |
| Benzothiazyl disulfide | 4 |
| Lead peroxide | 5 |

Cure—60 minutes at 320° F.

"Butyl 325" is a copolymer of isobutylene and isoprene sold by Enjay Company. "Vistanex L-100" is a polyisobutylene sold by Enjay Company. p-Quinone dioxime is sold by the Naugatuck Chemical Division of United States Rubber Co. under the trade name "G-M-F." Benzothiazyl disulfide is obtainable from several sources well known in the rubber industry.

An example of a neoprene type composition for use as an elastomeric liner portion is as follows:

|  | Parts by weight |
| --- | --- |
| "Neoprene Type W" | 100 |
| "Aranox" | 1 |
| "Octamine" | 4 |
| Stearic acid | 0.5 |
| Magnesia | 4 |
| MT Carbon Black | 60 |
| Whiting | 40 |
| Oil softener | 10 |
| "Staybelite Ester" | 10 |
| Zinc oxide | 15 |
| "NA-22" | 1 |

As a softener, a viscous petroleum oil such as Sundex 53 (Sun Oil Co.) or Coray 230 (Esso Standard) may be used.

Cure—15 minutes at 307° F.

"Neoprene Type W" is a stabilized chloroprene polymer containing no sulfur or compound capable of decomposing to liberate free sulfur. It is a product of E. I. du Pont de Nemours & Co., Inc. "Aranox" and "Octamine" are antioxidants sold by the Naugatuck Chemical Division of U.S. Rubber Company. "Staybelite ester" is a rosin derivative sold by Hercules Powder Company. "NA-22" is a neoprene accelerator sold by E. I. duPont de Nemours & Co., Inc.

Reference has been made hereinabove to the use of frangible materials for the liner portion 22. Such materials may include glass and ceramic materials such as clay products. They may also, in accordance with this invention, include organic materials, particularly such as certain plastic materials including, but not limited to, phenolic plastics. All such materials may be removed from the finished article starting with the position of the parts as shown in FIG. 3 by breaking the frangible liner portion into enough parts so that those parts may be separately removed from inside the finished article, all without any damage to that article.

As a lubricant for the core portion, silicone mold release fluids, which are well known in the rubber industry, are recommended. Several brands of such fluids are commercially available.

While but one form of the apparatus of the invention has been illustrated and certain variations thereof specifically described, other equivalent forms have been adverted to and various workable embodiments of formulations for the liner portion have been specifically set out herein. Other equivalents will occur to those skilled in the art from the teachings contained in the foregoing disclosure. I do not wish to be limited, therefore, except by the scope of the appended claims, which are to be construed validly as broadly as the state of the art permits.

What is claimed is:

1. Apparatus for forming molded plastic articles each having at least one cavity therein of a predetermined shape and dimensions, comprising rigid mold means for defining the outside of the articles to be molded, and a core assembly for forming said cavity in each of said articles, said core assembly having an outside configuration including at least one portion which will mechanically prevent said core assembly from being withdrawn from the cavity in one of said articles without variation in the outside shape or size of said core assembly or damage to or modification of the shape of the articles being molded;

said core assembly comprising a substantially rigid core portion which is tapered to relatively smaller lateral dimensions toward its outer end, and a one-piece liner portion of a predetermined material and having an inwardly tapering inside cavity conforming to the outside configuration of said core portion, said liner portion being disposed in a position surrounding said core portion to form said core assembly during the molding of an article in said mold means, and the space between said liner portion when assembled with said core portion as said core assembly on the one hand and said mold means on the other defining the space which plastic material may occupy during the molding of an article;

the inwardly tapering inside cavity of said liner portion permitting withdrawal of said core portion therefrom following the molding of a plastic article, and the material of said liner portion being such as to be substantially rigid under the temperature and pressure conditions used during the molding of a plastic article, but to permit the subsequent removal of said liner portion from said cavity in an article without damage to the molded article, notwithstanding the shape and dimensional relationships of such cavity as aforesaid after said core portion has been separated from said liner portion.

2. Apparatus for forming molded plastic articles in accordance with claim 1, in which said liner portion is of elastomeric material having a flexibility such that it may be removed from the cavity in each of said articles by flexure.

3. Apparatus for forming molded plastic articles in accordance with claim 2 in which said liner portion is formed of elastomeric material selected from the group consisting of neoprene and butyl rubber compositions when molding plastic articles of the polymerized acrylonitrile-butadiene-styrene type.

4. Apparatus for forming molded plastic articles in accordance with claim 1, in which said liner portion is of frangible material, which can be broken into parts and those parts removed from the cavity in each of said articles all without damage thereto.

References Cited in the file of this patent

UNITED STATES PATENTS

| 1,958,184 | Cross | May 8, 1934 |
| 2,037,545 | Sexton | Apr. 14, 1936 |
| 2,318,744 | Johnson | May 11, 1943 |
| 2,512,275 | Hawk | June 20, 1950 |
| 2,968,855 | Stolz | Jan. 24, 1961 |
| 3,069,744 | Emery | Dec. 25, 1962 |

UNITED STATES PATENT OFFICE
CERTIFICATE OF CORRECTION

Patent No. 3,158,906                        December 1, 1964

Edwin Leslie Boyer

It is hereby certified that error appears in the above numbered patent requiring correction and that the said Letters Patent should read as corrected below.

Column 6, line 72, for "2,313,744" read -- 2,318,692 --.

Signed and sealed this 20th day of April 1965.

(SEAL)
Attest:

ERNEST W. SWIDER                      EDWARD J. BRENNER
Attesting Officer                      Commissioner of Patents